United States Patent
Brizek

(10) Patent No.: US 8,352,748 B2
(45) Date of Patent: *Jan. 8, 2013

(54) SECURITY PROTOCOLS FOR PROCESSOR-BASED SYSTEMS

(75) Inventor: John P. Brizek, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/021,880

(22) Filed: Feb. 7, 2011

(65) Prior Publication Data

US 2011/0191596 A1     Aug. 4, 2011

Related U.S. Application Data

(63) Continuation of application No. 10/105,201, filed on Mar. 25, 2002, now Pat. No. 7,900,054.

(51) Int. Cl.
*G06F 21/00* (2006.01)
(52) U.S. Cl. ............................................ 713/189
(58) Field of Classification Search .................. 713/189, 713/162; 726/30; 380/247; 711/6, 100, 711/203
See application file for complete search history.

(56) References Cited

U.S. PATENT DOCUMENTS

| | | | |
|---|---|---|---|
| 4,937,736 A * | 6/1990 | Chang et al. | 711/208 |
| 6,035,380 A | 3/2000 | Shelton et al. | |
| 6,125,430 A | 9/2000 | Noel et al. | |
| 6,192,477 B1 | 2/2001 | Corthell | |
| 6,523,104 B2 | 2/2003 | Kissell | |
| 6,799,155 B1 * | 9/2004 | Lindemann et al. | 703/24 |
| 6,910,094 B1 * | 6/2005 | Eslinger et al. | 711/5 |
| 6,983,374 B2 * | 1/2006 | Hashimoto et al. | 713/194 |
| 2003/0097579 A1 | 5/2003 | England et al. | |
| 2003/0126454 A1 | 7/2003 | Glew et al. | |

* cited by examiner

*Primary Examiner* — Ali Abyaneh
(74) *Attorney, Agent, or Firm* — Trop, Pruner & Hu, P.C.

(57) ABSTRACT

A processor-based system such as a wireless communication module may implement security functions in a cost effective fashion by providing a virtual memory space whose addresses may be recognized. The memory is integrated with an application processor. When those addresses are recognized, access to special security protocols may be allowed. In another embodiment, a variety of dedicated hardware cryptographic accelerators may be provided to implement security protocols in accordance with a variety of different standards. By optimizing the hardware for specific standards, greater performance may be achieved.

20 Claims, 3 Drawing Sheets

SECURITY PROTOCOLS FOR PROCESSOR-BASED SYSTEMS

CROSS-REFERENCE TO RELATED APPLICATIONS

This application is a continuation of U.S. patent application Ser. No. 10/105,201, filed on Mar. 25, 2002 now U.S. Pat. No. 7,900,054.

BACKGROUND

This invention relates generally to processor-based systems and, in particular embodiments, to processor-based systems capable of implementing wireless communications.

Wireless communications may be implemented by cellular telephones as well as networked devices that use wireless protocols. A processor-based system then communicates with other systems using an appropriate wireless protocol.

A number of security procedures may be implemented to enable secure communications between two stations. In addition, it may be necessary to authenticate a given communicator to insure that the communicator is authorized to use the network such as a wireless telephone system.

Conventionally, security may be implemented through a dedicated module or plug-in card that includes its own separate processor-based system including a processor and memory. Conventionally called subscriber identity modules (SIMs), these processor-based systems function relatively independently of the system in which they are embedded. They provide access to secure data such as a subscriber's identity. This data control is enforced by an onboard processor.

The use of a removable SIM is a relatively high cost approach. The dedicated SIM adds significantly to the cost of the electronic system that it serves to protect.

Software techniques may also be used to provide security in electronic devices. Software only security solutions are subject to compromise from coding errors, viruses, and hacker attacks.

Thus, purely hardware approaches may be subject to some deficiencies in terms of cost and purely software approaches may be subject to deficiencies in terms of effectiveness.

Thus, there is a need for better ways to implement security protocols in processor-based systems, and in particular, those systems utilized for wireless communications.

DETAILED DESCRIPTION

Figure 1:
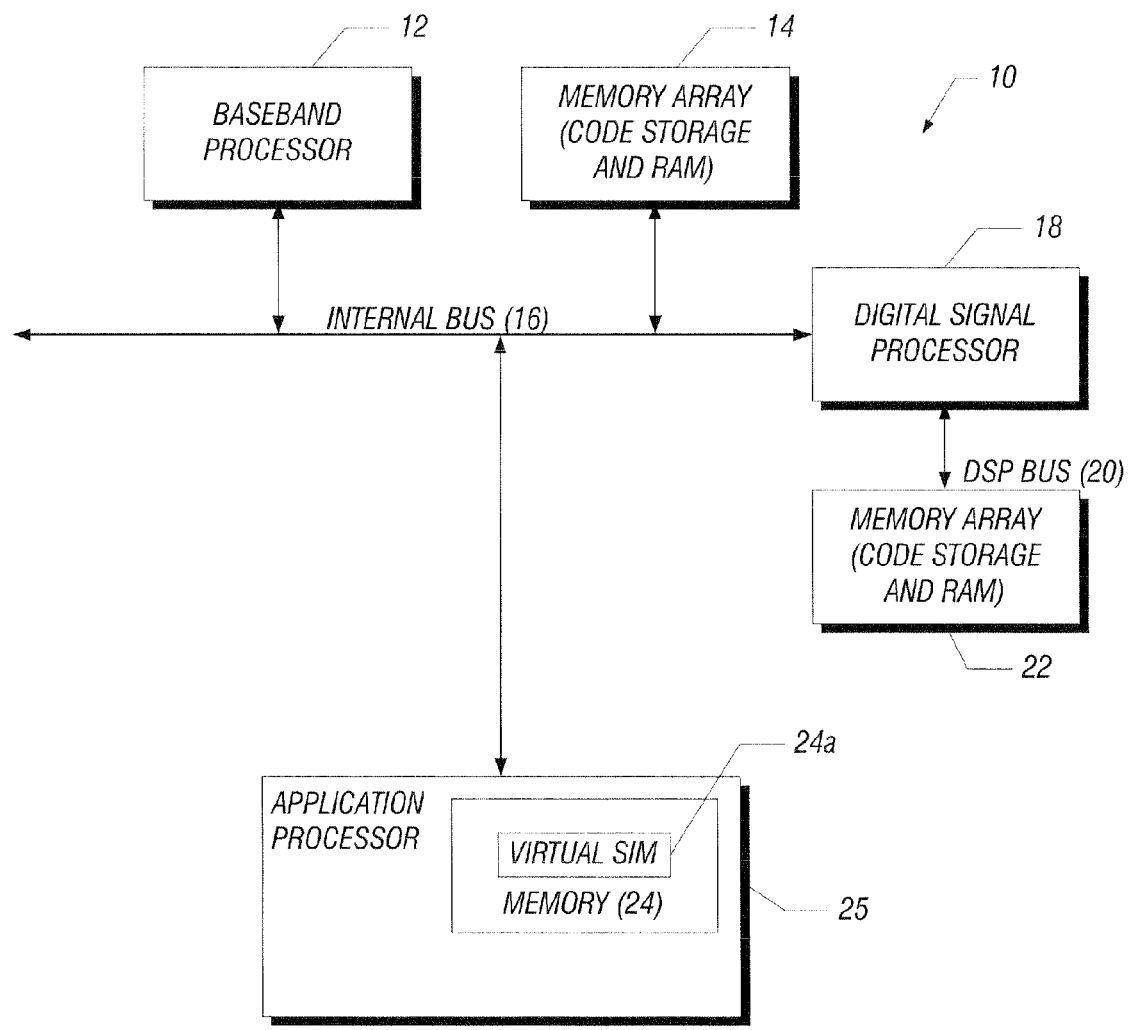
FIG. 1 is a schematic depiction of one embodiment of the present invention.

Referring to FIG. 1, a processor-based system 10 may be implemented, in one embodiment, as a wireless communication device. Two examples of such wireless communication devices include cellular telephones and networked devices, which communicate by a radio frequency signal.

An internal bus 16 couples a baseband processor 12 to a memory array 14. A digital signal processor 18 is also coupled to the bus 16 in one embodiment. In one embodiment, the digital signal processor 18 may include its own memory array 22 coupled to the processor 18 via a bus 20.

In one embodiment, a subscriber identity module is not utilized and instead, the security functions normally implemented through a subscriber identity module may be embedded within an application processor 25. Thus, a single integrated circuit may accomplish an application processing function and a subscriber identity module (SIM) function.

In general, an application processor 25 handles applications not directly involved in baseband operations. The application processor 25 may have embedded storage 24 that may include a virtual SIM 24a that may be a range of addresses dedicated to the SIM functions. In some embodiments, other components such as the baseband processor 12 may be integrated with the application processor 25. Thus, in some embodiments, the virtual subscriber identity module 24 includes an access-restricted, dedicated range of addresses in a memory space 24.

In some cases, the virtual SIM 24a may store software that implements user authentication, digital signatures, and the security protocols for mobile commerce transactions as well as implementing the SIM functions. In some cases, dedicated hardware or a control logic may be used with the virtual SIM 24a and in other cases, the application processor 25 may control the virtual SIM 24a.

By integrating the virtual SIM 24 with the application processor 25, the ability to hack or corrupt the SIM functions may be reduced. In addition, the overall system 10 may be made in smaller sizes and have reduced power consumption in some embodiments.

In some cases, the memory 24 may be formed of a non-volatile memory such as flash memory. In other cases, a volatile memory such as random access memory may be used together with a battery. In any case, the virtual SIM 24a address range within the memory 24 is physically integrated with the application processor 25. In such case, the application processor 25 may service the virtual SIM 24a as it does the rest of the memory 24. Access to the virtual SIM 24a may be controlled so that only certain applications can access the address range represented by the virtual SIM 24a.

Figure 2:
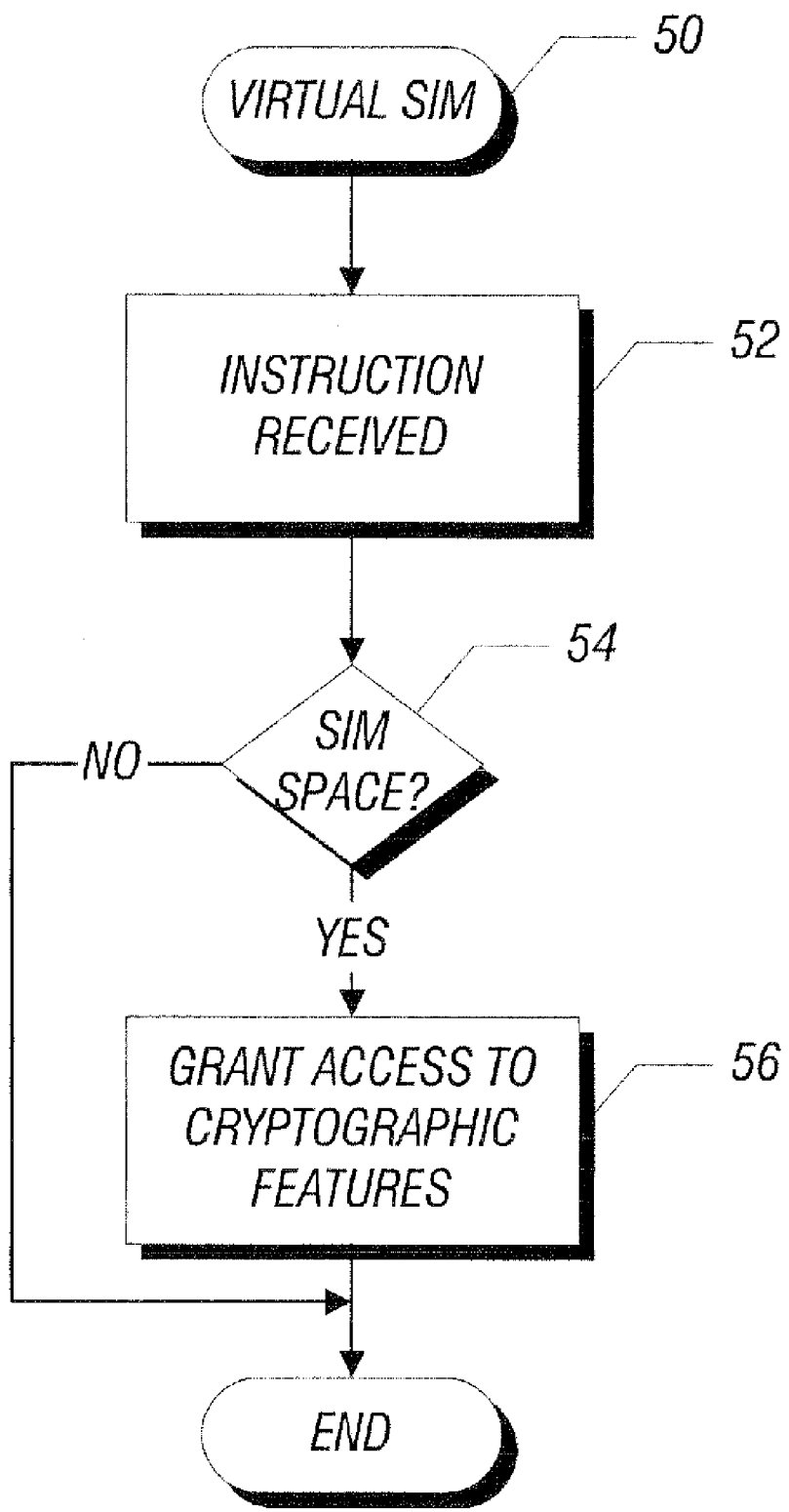
FIG. 2 is a flow chart for one embodiment of the present invention.

Referring to FIG. 2, the virtual SIM software 50 implements the virtual subscriber identity module functions. In short, the software 50 identifies particular instructions as bearing on particular addresses. If those addresses correspond to the space dedicated for security protocols, special privileges may be granted. In all other cases, access to security protocols may be precluded.

When an instruction is received as indicated at block 52, it is checked as indicated in diamond 54 to see if it relates to addresses in the dedicated virtual SIM space 25. If so, access may be granted for the instruction to various cryptographic features as indicated in block 56. Otherwise access privileges are not provided.

In some cases, the access to the security privileges may be implemented by providing an appropriate code word to the instruction. In other cases, the instruction may be allowed to access various hardware and software features of the system 10 to implement cryptographic functions.

Thus, in some embodiments, both secure and non-secure processes may utilize the same processing hardware, such as the baseband processor 12 and digital signal processor 18. If, in some embodiments, the virtual SIM implementation is not wholly software based it may not require dedicated hardware and as a result may be a more cost effective solution.

Figure 3:
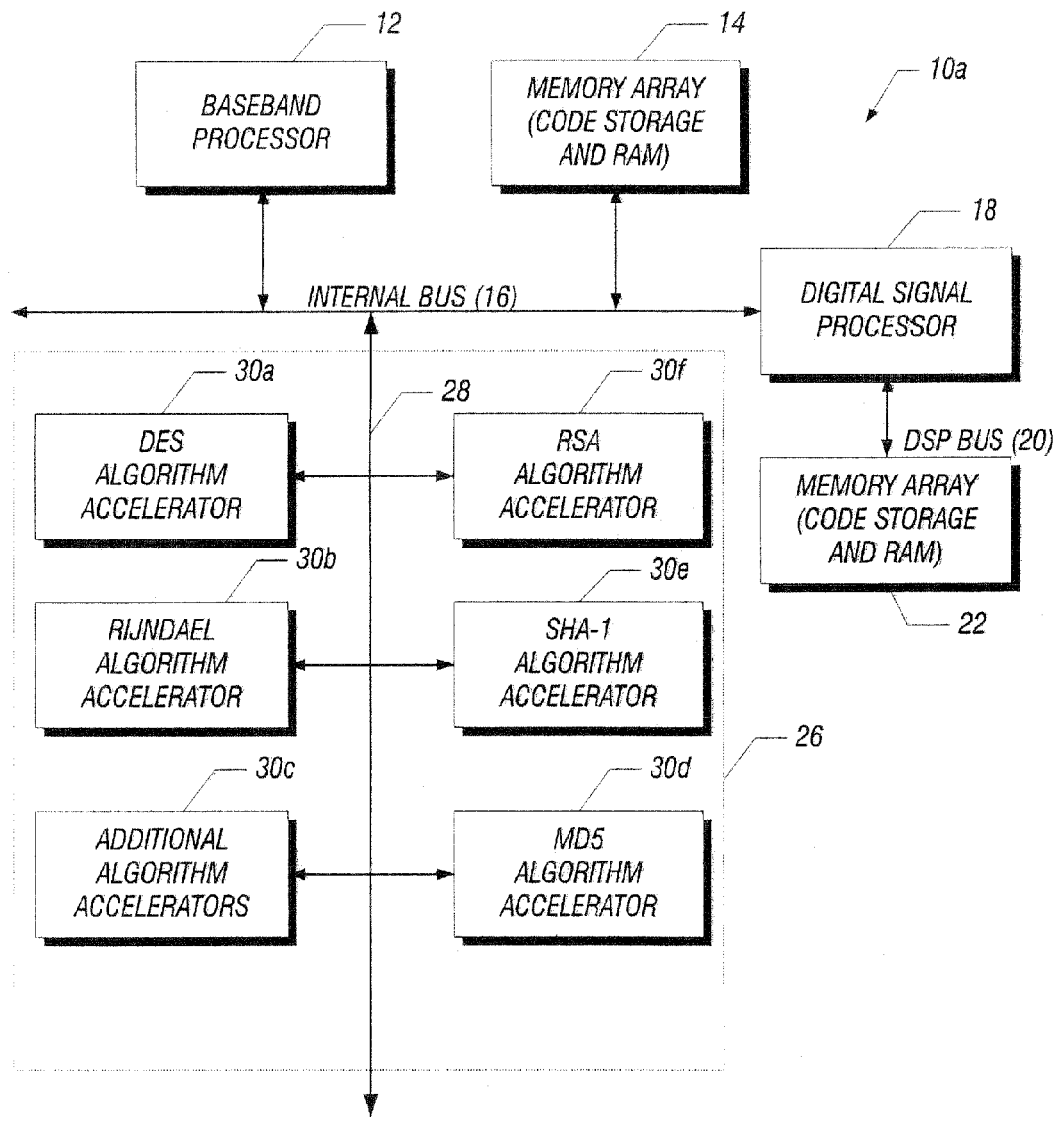
FIG. 3 is a schematic depiction of another embodiment of the present invention.

Referring to FIG. 3, another processor-based system 10a may include a baseband processor 12, a memory array 14, an internal bus 16, a digital signal processor 18, a digital signal processor bus 20, and a memory array 22 in some embodiments. Coupled to the internal bus 16 is an array of hardware cryptographic accelerators 26. For example, a Data Encryption Standard (DES) algorithm accelerator 30*a* (See National Bureau of Standards NBS FIPS PUB 46, "Data Encryption Standard", National Bureau of Standards, U.S. Dept. of Commerce, January 1977), an Advanced Encryption Standard (AES) (See J. Daemen, V. Rigmen, "The Block Cipher Rijndael," Smart Card Research and Applications, LNCS 1820, J.-J. Quisquater and B. Schneier, Eds., Springer-Verlag, 2000, pp. 286-296) or Rijndael algorithm accelerator 30*b*, a RSA algorithm accelerator 30*f* (See R. L. Rivest, A. Shamir and L. M. Adleman, "A Method for Obtaining Digital Signatures and Public-Key Cryptosystems" Communications of the ACM, v. 21, n. 2, February 1978, pp. 120-6.), a Securing Hash Algorithm, (SHA-1) accelerator 30*e* (See National Bureau of Standards and Technology, NIST FIPS PUB 186, "Digital Signature Standard" U.S. Department of Commerce, May 1994), a Message Digest 5 (MD5) algorithm accelerator 30*d* (See R. L. Rivest, "The MD5 Message Digest Algorithm", RFC 1320, April 1992) may be included as well as additional algorithm accelerators 30*c*. Thus, the array 26 may include a wide variety of hardware based security algorithm accelerators including one way hash function (SHA-1 and MD5). The system may use the virtual subscriber identity module 25 described with respect to the previous embodiments as well.

Because each accelerator 30 in the array 26 is dedicated to a special purpose, its performance for a particular standard may be optimized. The control of each accelerator in the array 26 may be controlled by one of the processors 12 or 18. In some embodiments, the array 26 may be integrated on a single integrated circuit.

Using symmetric, asymmetric, hashing and privacy algorithms, a variety of security protocols can be serviced by the array 26 of accelerators 30.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    an application processor, said application processor to execute first and second applications, said application processor including a storage having a virtual memory space and said application processor adapted to detect instructions directed to addresses associated with said virtual memory space, to identify which of said first and second applications issued said instructions to an address associated with said virtual memory space and to allow the first application that issued instructions to said address but not the second application that did not issue instructions to said address, access to cryptographic functions to implement a security protocol; and
    a memory coupled to said application processor.

2. The apparatus of claim 1 wherein said apparatus detects instructions directed to said memory space by comparing the addresses of said instructions to the addresses corresponding to said virtual memory space.

3. The apparatus of claim 1 wherein said apparatus only allows instructions directed to said memory space to access cryptographic functions.

4. The apparatus of claim 1 including a plurality of cryptographic accelerators each for different cryptographic techniques.

5. The apparatus of claim 4 including a data encryption standard algorithm accelerator.

6. The apparatus of claim 5 including a Rijndael algorithm accelerator.

7. The apparatus of claim 5 including at least three different hardware cryptographic algorithm accelerators.

8. The apparatus of claim 7 including an integrated circuit including all of said cryptographic accelerators.

9. The apparatus of claim 1 wherein said security protocol to accomplish a subscriber identity module function.

10. The apparatus of claim 1 wherein said apparatus is a cellular telephone.

11. A method comprising:
    integrating an application processor with a storage having a virtual memory space associated with a particular address;
    detecting instructions directed to said address associated with said virtual memory space;
    detecting whether a first or a second application is directing instructions to said address; and
    granting access to the first application that directed instructions to said address access to a cryptographic function and denying access to the second application that did not direct instructions to said address.

12. The method of claim 11 including assigning an address range to said virtual memory space.

13. The method of claim 11 including detecting instructions directed to said memory space by comparing the addresses of said instructions to the addresses corresponding to said virtual memory space.

14. The method of claim 11 including allowing only instructions addressed to said memory space to access said cryptographic functions.

15. The method of claim 11 including providing separate cryptographic accelerators for a plurality of cryptographic techniques.

16. The method of claim 15 including providing a data encryption standard algorithm accelerator.

17. The method of claim 16 including providing a Rijndael algorithm accelerator.

18. The method of claim 15 including providing at least three different hardware cryptographic algorithm accelerators.

19. The method of claim 18 including providing said cryptographic accelerators on the same integrated circuit.

20. The method of claim 11 including using said virtual memory space to implement a subscriber identity module function.

* * * * *